May 30, 1933.   G. MARCUM   1,912,084
BOTTLE CLOSURE
Filed March 2, 1932
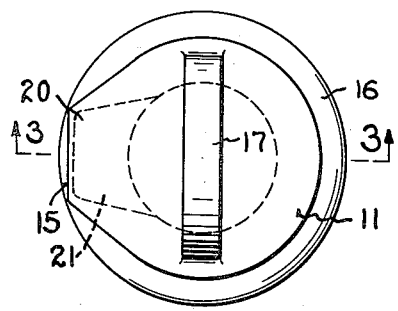
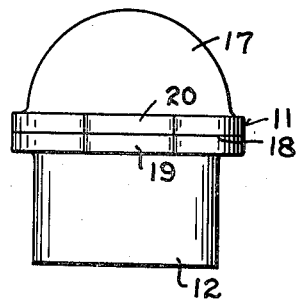
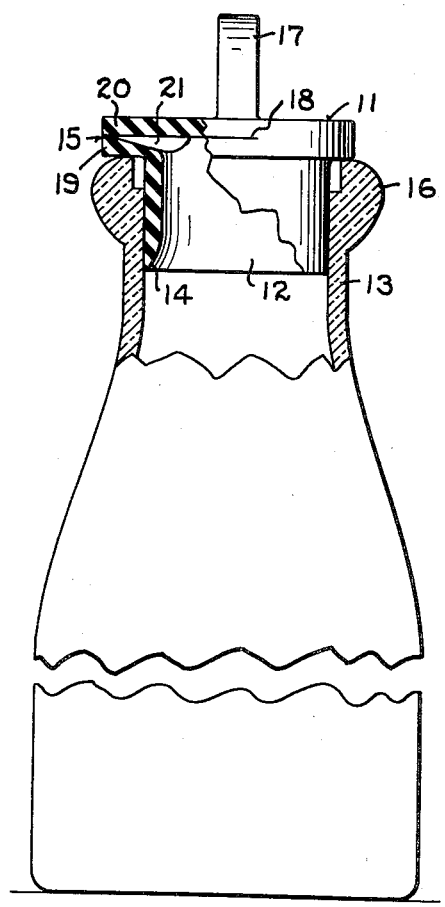
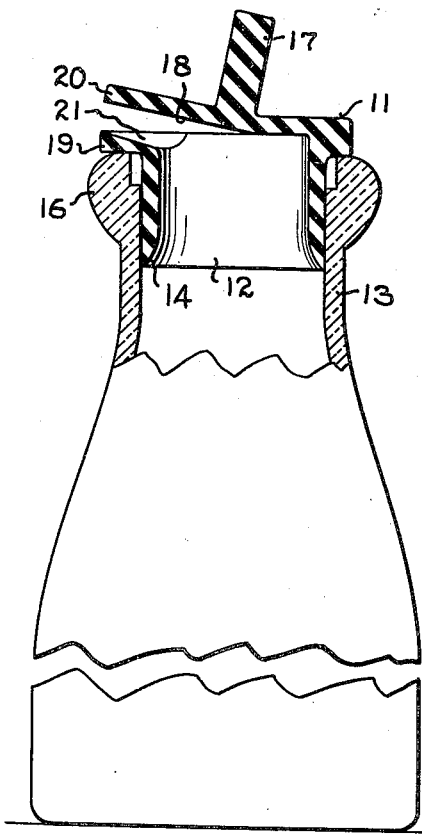
INVENTOR.
GEORGE MARCUM.
BY H.C. Karl.
HIS ATTORNEY.

Patented May 30, 1933

1,912,084

UNITED STATES PATENT OFFICE

GEORGE MARCUM, OF CINCINNATI, OHIO

BOTTLE CLOSURE

Application filed March 2, 1932. Serial No. 596,320.

My invention relates to a new and improved closure cap arranged to be inserted in the neck of the bottle and having a flexible top member which can be flexed to permit pouring of the liquid from the bottle and which will be self-sealing when not in use. My invention is particularly useful in connection with milk bottles wherein a portion of the contents of the bottle is used at a time. The lip construction of the milk bottle is such as will not permit ready pouring of the liquid without causing a portion of the liquid to run down the side of the bottle. Furthermore, in order to maintain the milk in a fresh and wholesome condition it is necessary to keep the bottle capped when not in use.

My invention overcomes these objections by providing a cap provided with a pouring lip and a flexible top which automatically seals the bottle.

The object of my invention is to provide a cap preferably made of rubber and having a cylindrical member arranged to be inserted in the neck of the bottle and provided with a top of greater diameter than the neck of the bottle. A further object is to provide the top with a horizontal incision whereby the top will form a pair of jaws, and providing the top with a lug extending upwardly from the upper jaw to permit flexing of the upper jaw to form a pouring opening. A further object is to provide the lower jaw with a recessed portion to form a pouring spout, whereby the liquid being poured will not run down the side of the bottle.

My invention will be further readily understood from the following description and claims and from the drawing, in which latter:

Fig. 1 is a plan view of my device inserted in a milk bottle,

Fig. 2 is a front view of the device,

Fig. 3 is a vertical cross-section of the same, taken in the plane of the line 3—3 of Fig. 1, and partly broken away, and;

Fig. 4 is a vertical cross-section with the upper jaw shown in a flexed position.

My improved cap comprises an annular top member 11 from which a depending cylindrical sleeve 12 extends. This sleeve is arranged to fit the neck of a bottle 13. The lower margin of the sleeve has an arcuate edge 14 to permit the full contents of the bottle 13 to be poured therefrom. The top is provided with an extending lip 15 arranged to extend to approximately the outer edge of the bead 16 at the upper edge of the bottle. A lug 17 extends upwardly from the top, approximately in the center of the cap.

After the cap is molded, an incision 18 is made in the top member 11 to provide a pair of jaws 19 and 20. The jaw 19 is provided with a tapered recess 21 to provide a pouring groove therein. The jaws 19 and 20 normally are in close contact to form a seal for the bottle. When it is desired to pour liquid from the bottle the lug 17 is flexed backward as shown in Fig. 4, which flexing will raise the jaw 20 away from the jaw 19 for permitting the pouring of the fluid from the bottle. The jaw 19 being provided with the pouring groove allows the liquid to pour freely therefrom and prevents the liquid from running down the side of the bottle after the pouring ceases.

Having thus fully described my invention what I claim as new and desire to secure by Letters Patent, is:

1. A bottle closure comprising an annular top member, a cylindrical member extending downwardly from said top and arranged to fit the neck of a bottle, said top being of greater diameter than said cylindrical member, said top provided with an extending lip, and being split horizontally from said lip to approximately the center of said top for forming a pair of jaws, a lug on said top for flexing said upper jaw, and said lower jaw provided with a concave recess to form a spout.

2. A molded closure cap for a bottle comprising a flexible molded top member, a depending cylindrical flange extending downwardly from said top member, said top member being split to form a pair of jaws, a lug extending upwardly from said upper jaw for operating said upper jaw, and said lower jaw provided with a recessed portion to form a pouring spout.

3. A bottle closure consisting of a head of flexible material, said head being partially split horizontally to form a pair of jaws, and means extending below said head for attachment to a bottle, said lower jaw being provided with a concave recess to form a pouring spout.

4. A bottle closure consisting of a head of flexible material, said head being partially split horizontally to form a pair of jaws, and means extending below said head for attachment to a bottle, said lower jaw being provided with a concave recess to form a pouring spout and said upper jaw being provided with an extending lug for flexing said upper jaw.

In testimony whereof, I have hereunto signed my name.

GEORGE MARCUM.